United States Patent
Kameda et al.

[11] Patent Number: 5,271,478
[45] Date of Patent: Dec. 21, 1993

[54] POWER TRANSMITTING SYSTEM

[75] Inventors: Osamu Kameda; Hideo Toyota, both of Hiroshima, Japan

[73] Assignees: Mazda Motor Corporation, Hiroshima; Tochigi Fuji Sangyo Kabushiki Kaisha, Tochigi, both of Japan

[21] Appl. No.: 660,010

[22] Filed: Feb. 25, 1991

[30] Foreign Application Priority Data

Feb. 27, 1990 [JP] Japan ............... 2-46943

[51] Int. Cl.⁵ .................. B60K 17/354; B60K 23/08
[52] U.S. Cl. ....................... 180/247; 180/250; 192/53 D; 74/665 T
[58] Field of Search ........... 180/249, 248, 250, 247; 74/665 T; 475/252; 192/48.2, 53 D

[56] References Cited

U.S. PATENT DOCUMENTS

| | | | |
|---|---|---|---|
| 4,484,654 | 11/1984 | Hayakawa | 180/248 X |
| 4,648,492 | 3/1987 | Moore | 192/53 D X |
| 4,718,303 | 1/1988 | Fogelberg | 180/249 X |
| 4,733,577 | 3/1988 | Griesser et al. | 192/48.2 X |
| 4,846,010 | 7/1989 | Fujkawa et al. | 180/249 X |
| 4,860,612 | 8/1989 | Dick et al. | 74/665 T |
| 4,878,399 | 11/1989 | Kameda | 180/250 X |
| 4,901,598 | 2/1990 | Batchelor et al. | 180/247 X |
| 4,989,686 | 2/1991 | Miller et al. | 180/197 |
| 5,005,663 | 4/1991 | Niide et al. | 180/248 X |
| 5,057,062 | 10/1991 | Yamasaki et al. | 180/249 X |

FOREIGN PATENT DOCUMENTS

| | | |
|---|---|---|
| 2209879 | 7/1972 | Fed. Rep. of Germany . |
| 63-192620 | 8/1988 | Japan . |
| 1-149057 | 10/1989 | Japan . |
| 1278841 | 11/1989 | Japan . |
| 88/07639 | 10/1988 | PCT Int'l Appl. . |
| 2231628 | 11/1990 | United Kingdom . |

Primary Examiner—Margaret A. Focarino
Assistant Examiner—Kevin Hurley
Attorney, Agent, or Firm—Keck, Mahin & Cate

[57] ABSTRACT

A power transmitting system for a vehicle includes a rotatable input shaft for introducing driving power into the system, a rotatable first output shaft for transmitting the driving power from the system, and a rotatable second output shaft for also transmitting the driving power from the system. A transmitting member is rotatably mounted on the first output shaft and for rotating the second output shaft, a clutch mechanism is disposed adjacent to the transmitting member and mounted on the first output shaft for engaging the transmitting member with the first output shaft. An actuator is provided for actuating the clutch mechanism. A compact power transmitting system can be obtained.

20 Claims, 5 Drawing Sheets

POWER TRANSMITTING SYSTEM

BACKGROUND OF THE INVENTION

1. Field of the Invention

This invention relates to a driving power transmitting system of a vehicle.

2. Description of the Related Art

Conventionally, there has been known a power transmitting system in which driving power is transmitted from an input shaft of the system to an output shaft for front wheels and an output shaft for rear wheels as shown in Japanese Utility Model Public Disclosure No. 1-149057, laid open to the public in 1989.

The power transmitting system disclosed in this Japanese document pertains to so a called a part time 4WD system on a continuous rear wheel drive system. In the part time 4WD system, the driving power is transmitted to the output shaft for the rear wheels continuously through a switching mechanism and a differential mechanism and on and off to the output shaft for the front wheels when desired. In order to transmit the driving power to the output shaft for the front wheels at the desired operation, there is provided a drive mode switching mechanism for selectively establishing, one of three different drive modes for driving the wheel. In the first drive mode, the driving power from the differential mechanism is transmitted to only the rear wheels so that a two wheel drive mode is established. In second drive mode, the driving power in the differential mechanism is transmitted to both output shafts for the front and rear wheels to allow a speed difference between the front and rear wheels and establish a differential four wheel drive mode in which a center differential gear mechanism is unlocked to allow differential operation between the output shafts for the front and rear wheels. In third drive mode, the driving power is transmitted to both the front and rear wheels so as to prohibit differential movement a locked four wheel drive mode in which the center differential mechanism is locked.

The power transmitting mechanism disclosed in Japanese Utility

Model Public Disclosure No. 1-149057 is provided with a sleeve in the switching mechanism which is moved longitudinally so that a spline of the sleeve is selectively brought into engagement with a spline of the output shaft for the front wheels, a spline of the input shaft and a spline of the output shaft for the rear wheels.

For switching the drive mode of the vehicle, another switching mechanism is known utilizing a clutch mechanism. This type of switching mechanism is disclosed in Japanese Patent Public Disclosure No. 1-278841, laid open to the public in 1989 and is provided with a clutch mechanism which is operated to be engaged and disengaged so as to establish selectively one of the drive modes allowing differential movement between the output shafts for the front wheels and the rear wheels and prohibiting the differential movement. In order to accomplish such operation of the clutch mechanism, there is provided a electromagnet in the mechanism to be energized or disenergized.

Japanese Patent Public Disclosure No. 63-192620, laid open to the public on Aug. 10, 1988, also discloses similar type of power transmitting system.

It should, however, be noted that the conventional switching mechanism having a clutch mechanism and an electromagnet for driving the clutch mechanism makes the switching mechanism bulky.

SUMMARY OF THE INVENTION

It is, therefore, an object of the invention to provide a compact power transmitting system incorporating a clutch mechanism therein for switching the drive mode of the power transmitting system.

Another Object of the invention is to provide an improved switching mechanism for a four wheel drive vehicle in which one of the two wheel drive mode, the differential four wheel drive mode and locked four wheel drive mode is selectively established.

The above and other objects of the invention can be accomplished by a power transmitting system for a vehicle comprising a rotatable input shaft for introducing driving power into the system, a rotatable first output shaft for transmitting the driving power from the system, a rotatable second output shaft for transmitting the driving power from the system, a transmitting member rotatably mounted on the first output shaft for rotating the second output shaft, a clutch mechanism disposed adjacent to the transmitting member and mounted on the first output shaft for engaging the transmitting member with the first output shaft and actuator means for actuating the clutch mechanism.

In operation, when actuated, the actuator means causes the clutch mechanism to engage the transmitting member with the first output member so that the first output shaft is rotated integrally with the transmitting member. The present invention can be conveniently applied for both a part time 4WD vehicle and a full time 4WD vehicle.

When the present invention is applied to the part time 4WD vehicle, the rotation of the input shaft is transmitted to the transmitting member, resulting in continuous rotation of the second output shaft. In this case, where the clutch mechanism is disengaged, the driving power is not transmitted to the first output shaft so that the two wheel drive condition (2WD drive mode) is established. On the other hand, where the clutch mechanism is engaged, the transmitting member is engaged with the first output shaft so that the four wheel drive condition (4WD drive mode) is established. Thus, in the part time four wheel drive vehicle, the clutch mechanism functions as a switching mechanism between the two wheel drive condition and the four wheel drive condition.

In the case where the present invention is applied to the full time four wheel drive vehicle, the rotation of the input shaft is transmitted to the transmitting member and the first output shaft to rotate the first and second output shafts continuously. In this case, when the clutch mechanism is disengaged, the first and second output shafts are rotated with a certain speed difference (allowance of the differential movement). When the clutch mechanism is engaged, the differential movement between the first and second output shafts is restricted (restriction of the differential movement). Therefore, when the present invention is applied to the full time four wheel drive vehicle, the clutch mechanism functions as a switching mechanism between the allowance of the differential movement and restriction thereof.

The actuator means can be provided with an electromagnet. The actuator means may be disposed externally of a journal portion of a casing for rotatably carrying the first output shaft.

The clutch mechanism includes an external member joined with the transmitting member. Within the external member, there are disposed a main clutch adjacent to the transmitting member for engaging the transmitting member with the first output shaft and a pilot clutch adjacent to the actuator means for causing the main clutch to be actuated.

Preferably, the actuator means is disposed on the opposite side of the clutch mechanism from the transmitting member. This arrangement accomplishes a compact power transmitting system.

The above and other objects and features of the present invention will be apparent from the following description and by making reference to the accompanying drawings.

DESCRIPTION OF THE PREFERRED EMBODIMENTS

Figure 1:
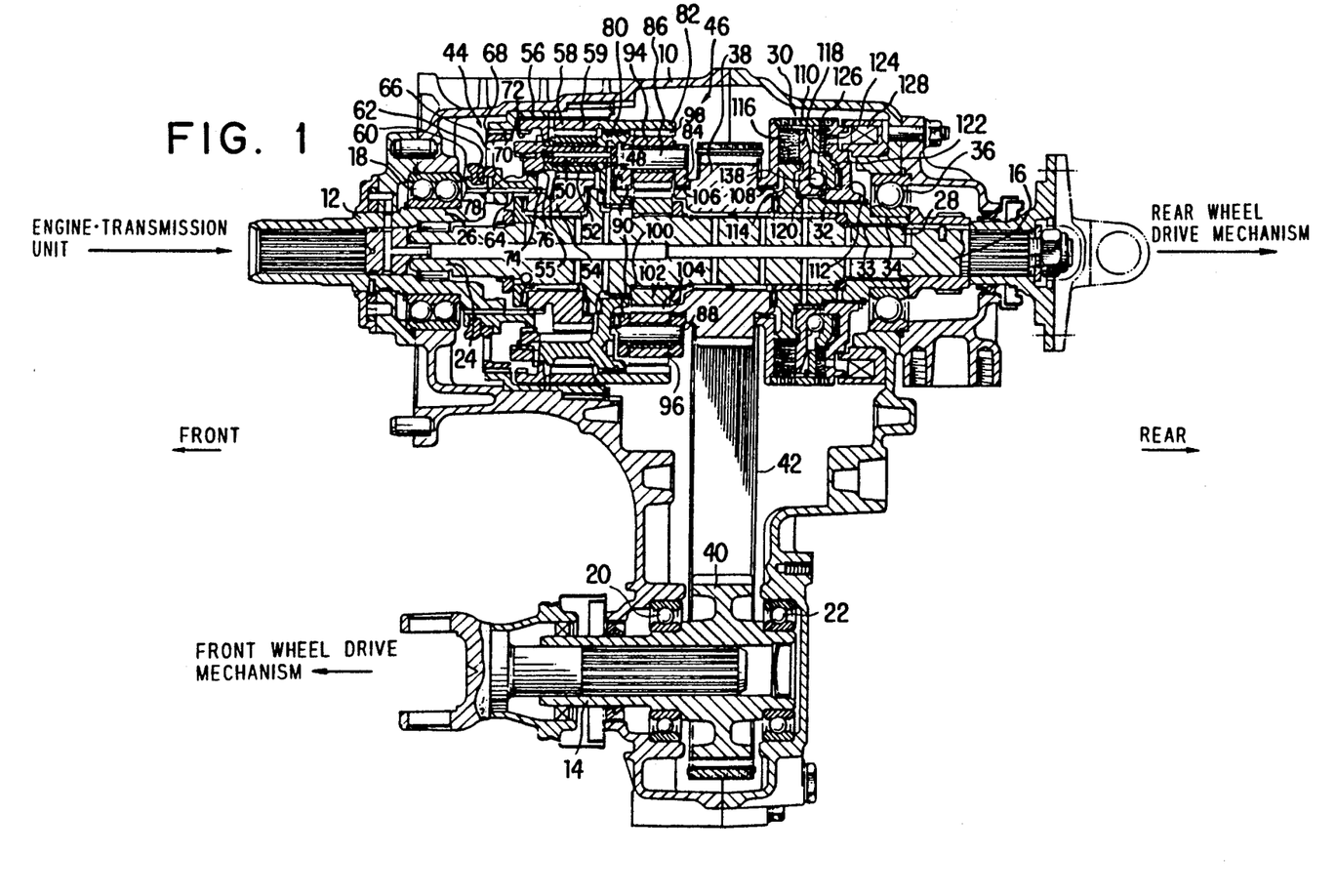
FIG. 1 is a sectional view of a power transmitting system in accordance with the present invention.

Referring to FIG. 1, there is shown a sectional view of a power transmitting system in accordance with a primary embodiment of the Present invention. The illustrated system is of a full time four wheel drive vehicle having a switching mechanism.

In FIG. 1, a casing 10 rotatably carries an input shaft 12, an output shaft 14 for driving front wheels, and an output shaft 16 for driving rear wheels therein. The input shaft 12 is rotatably carried by the casing 10 through a journal portion 18 of the casing 10 and rotated by driving power from an engine-transmission unit (not shown).

The output shaft 14 is rotatably carried by the casing 10 through journal portions 20, 22 and transmits the driving power to a front wheel drive mechanism (not shown). The output shaft 16 for the rear wheels is rotatably carried by the journal portion 18 through an inner surface of the rear end of the input shaft 12 at a front end portion thereof. A rear end 28 of the output shaft 16 is rotatably carried by a journal portion 36 through a rear portion 34 of a rotating member 32 of a clutch mechanism 30 to transmit the driving power to a rear wheel drive mechanism (not shown). The rotating member 32 is brought into spline engagement with the output shaft 16 for the rear wheels through a spline 33 thereof so that the rotating member 32 rotates integrally with the output shaft 16.

A sprocket 38 is rotatably mounted on the output shaft 16 for the rear wheels forward of the clutch mechanism 30. On the output shaft 14 is mounted a sprocket 40 at the rear end thereof. The input shaft 12 is coaxially extended with the output shaft 16 for the rear wheels. The output shaft 14 is extended in parallel with the output shaft 16. The sprocket 38 on the output shaft 16 is connected with the sprocket 40 on the output shaft 14 through a chain 42 so that the driving force as a rotating force of the sprocket 38 is transmitted to the sprocket 40 through the chain 42 to thereby rotate the output shaft 14 for the front wheels.

Between the journal portion 18 and the sprocket 38 are coaxially disposed a speed switching mechanism 44 and a differential mechanism 46 in axial direction of the output shaft 16. The switching mechanism 44 switches the power transmitting path to transmit the driving power with a high speed or a low speed from the input shaft 12 to the differential mechanism 46. The differential mechanism 46 transmits the driving force from the speed switching mechanism 44 to the output shaft 14 for the front wheels through the sprocket 38, chain 42 and sprocket 40 while allowing a differential movement between the output shafts 14 and 16.

The clutch mechanism 30 is operated to engage and disengage the sprocket 38 to and from the output shaft 16 so as to control the allowance of the differential movement between the output shafts 14 and 16 for the front and rear wheels.

On the output shaft 16 for the rear wheels is rotatably mounted a carrier 48 which rotatably carries a pinion gear 52 on a shaft 50 of the carrier 48. On the output shaft 16 for the rear wheels is rotatably mounted a sun gear 54 of which gear portion 55 is brought into meshing engagement with the pinion gear 52. Within the casing 10 is disposed a gear case 56 in which a ring gear 58 is disposed with a gear portion 59 of the ring gear 58 being meshed with the pinion gear 52. An external surface of the rear end portion of the input shaft 12 is formed with a spline 60 with which a spline 64 formed on an internal surface of the ring assembly 62 is normally engaged With an external surface of the ring assembly 62 is engaged an operating member 66 movable in an axial direction of the input shaft 12. An axial movement of the operating member 66 causes the ring assembly 62 to be moved in the axial direction. The ring assembly 62 is rotatable relative to the operating member. An external spline 68 of the operating member 66 is engaged with an inner spline 70 formed on an internal surface of the case 56. When the operating member 66 is moved rightward in FIG. 1, the spline 68 of the operating member 66 is brought into engagement with an inner spline 72 of the ring gear 58. The inner spline 64 of the ring assembly 62 is engaged with an external spline 74 of the sun gear 54. When the ring assembly 62 is moved in the right direction, an external spline 76 of the ring assembly 62 is disengaged from an internal spline 78 formed on a front end portion of the shaft 50 of the carrier 48.

In operation, the inner spline 64 of the ring assembly 62 is engaged with the spline 60 of the input shaft 12 and the external spline 76 of the ring assembly 62 is engaged with the spline 78 of the shaft 50 of the carrier 48 in the illustrated condition. Thus, the input shaft 12 is connected with the carrier 48 through the ring assembly 62 so that the carrier 48 rotates with the same speed as the input shaft 12. In this case/ the spline 68 of the operating member 66 is engaged with the spline 70 of the case 56 and not with the spline 72 of the ring gear 58 so that the ring gear 58 is in a racing condition.

Therefore, in the condition illustrated in FIG. 1, the switching mechanism 44 is set at the high speed condition.

When the operating member 66 is moved rightward from the illustrated position, the internal spline 64 of the ring assembly 62 is kept engaged but the external spline 76 of the ring assembly 62 is disengaged from the spline 78 of the shaft 50 of the carrier 48. The spline 68 of the operating member 66 is engaged with the spline 72 of the spline 70 of the case 56 and the spline 72 of the ring gear 58. As a result, the input shaft, 12 is engaged with the sun gear 54 through the ring assembly 62. The ring gear 58 is engaged with the case 56 through the operating member 66 to be fixed. Thus, the sun gear 54 rotates with the same speed as the input shaft 12. However, since the ring gear 58 is not rotated, the carrier 48 is rotated through the pinion gear 58 with a speed lower than the input shaft 12.

Consequently, the rightward movement of the operating member 66 and the ring assembly 62 from the illustrated position in FIG. 1 establishes the low speed condition of the switching mechanism 44.

Hereinafter, a detailed description will be made of the differential mechanism 46.

An external surface of the carrier 48 is engaged with a ring gear 82 through a spline 80. On a rear end portion of the carrier 48 are rotatably mounted an outer shaft 86 of another carrier 84 and a front support portion 90 of an inner shaft 88 referring to further FIG. 1A. The outer shaft 86 and inner shaft 88 of the carrier 84 rotatably mount an outer pinion gear 94 and an inner pinion gear 96 thereon respectively with the outer pinion gear 94 being meshed with the inner pinion gear 96. The outer pinion gear 94 is meshed with a gear portion 98 of the ring gear 82. The output shaft 16 for the rear wheels is engaged with a sun gear 102 through a spline 100. A gear portion 104 of the sun gear 102 is meshed with the inner pinion gear 96. The carrier 84 is engaged through a spline 106 with the sprocket 38 which rotates the output shaft 14 for the front wheels.

Figure 1A:
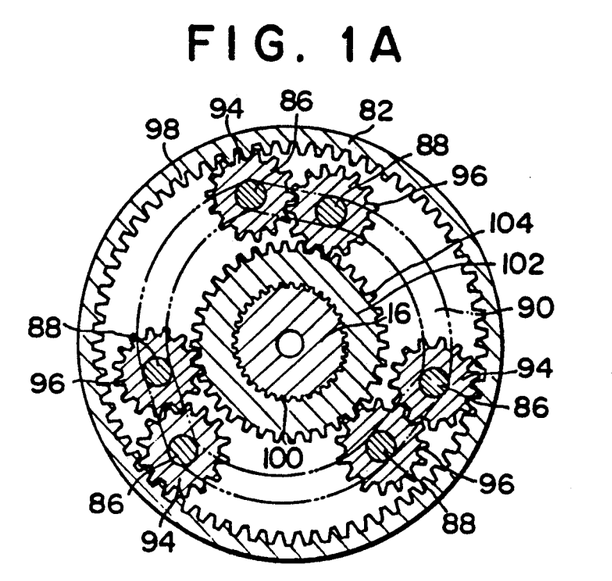
FIG. 1A is a sectional view of a differential mechanism applied to the present invention.

In operation of the differential mechanism 46, when no spin or slippage is produced in the front and rear wheels, the ring gear 82, the pinion gears 94, 96 and the sun gear 102 are rotated integrally as a single unit. Therefore, the rotation of the carrier 48 causes the sprocket 38 to be rotated with the same speed as the output shaft 16 for the rear wheels. As a result, the output shaft 14 and 16 are rotated with the same speed.

When the rear wheel produces a spin or slippage, the front wheels are subjected to a larger distribution of the driving power whereas the distribution of the driving power for the rear wheel is remarkably reduced. As a result, the carrier 84 for rotating the output shaft 14 for the front wheels is virtually prevented from rotating. Under this condition, the rotation of the other carrier 48 is transmitted to the output shaft 16 for the rear wheels through the ring gear 82, pinion gear 94, 96 and the sun gear 102.

On the other hand, when the front wheel produces a spin, the driving power is largely provided to the rear wheels whereas the driving power actually transmitted to the front wheels is remarkably reduced. Therefore, the output shaft 16 of the rear wheels is virtually prevented from rotating.

In this condition the rotation of the carrier 48 is transmitted to the output shaft 14 for the front wheels through the ring gear 82, pinion gear 94, 96 and through the carrier 84 and sprocket 38.

Hereinafter, a detailed description will be made of the clutch mechanism 30.

As aforementioned, the output shaft 16 for the rear wheels is engaged with the inner rotating member 32 through the spline 33. The sprocket 38 is engaged with an outer rotating member 110 through a spline 108. An inner surface of the outer rotating member 110 is rotatably mounted on the inner rotating member 32 at the rear end. Between a front end of an outer portion 114 of the inner rotating member 32 and the outer rotating member 110 is disposed a main clutch 116 having a plurality of clutch plates juxtaposed and extending radially with regard to a center axis of the output shaft 16. An operating member 118 is disposed rearward of the main clutch 116 to be engaged with the rear end clutch plate of the main clutch 116. The operating member 118 is engaged with the inner rotating member 32 through a spline 120 for an axial movement of the output shaft 16.

When the operating member 118 is moved axially to engage and disengage the main clutch 116, the inner rotating member 32 is rotated together with and separately from the outer rotating member 110 in response to the axial movement of the inner rotating member 32.

An operating member 122 located rearward of the operating member 118 is axially movably disposed forward of a radially extended rear end portion 112 of the outer rotating member 110. Between the operating member 122 and the outer rotating member 110 is disposed a pilot clutch 124 having a plurality of clutch plates juxtaposed in the axial direction of the output shaft 16 and extending radially with regard to the center axis of the output shaft 16. An iron piece 126 is axially movably carried by the outer rotating member 110 forward of the pilot clutch 124. An electromagnet 128 is provided on the casing 10 rearward of the pilot clutch 124. When the electromagnet 128 is energized, the iron piece 126 is urged toward the electromagnet 128 so that the pilot clutch 124 is engaged. Thus, the outer rotating member 110 is joined with the operating member 122 as a single unit.

Figure 1B:
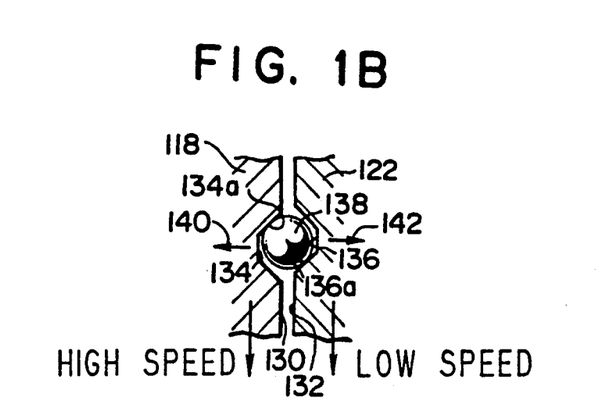
FIG. 1B is a sectional view of operating members including a steel ball applicable to the present invention.

On facing surfaces 130, 132 of the operating members 118 and 122 as shown in FIG. 1B are formed a plurality of recesses 134, 136 in which a steel ball 138 is disposed.

In operation of the clutch mechanism 30, when the electromagnet 128 is not energized, the iron piece 126 does not cause the pilot clutch 124 to be operated. Thus, the pilot clutch 124 is kept disengaged. Under the condition, the operating member 122 rotates together with the operating member 118 through the steel ball 138. In this case, the operating member 118 rotates together with the inner rotating member 32. Since the main clutch 116 is disengaged, the inner rotating member 32 is allowed to be rotated separately from the outer rotating member 110. Therefore, the sprocket 38 is disconnected from the output shaft to be rotated independently from each other so that the differential movement between the output shaft 14 for the front wheels and the output shaft for the rear wheels 16 is allowed.

On the other hand, when the electromagnet is energized, the iron piece 126 is moved axially toward the electromagnet to cause the pilot clutch 124 to be engaged so that the operating member 122 rotates together with the outer rotating member 110. In this case, the operating member 118 rotates together with the inner rotating member 32. When the output shaft 16 for the rear wheels rotates with a speed higher than the output shaft 14 for the front wheels, the operating member 118 rotates with a high speed whereas the operating member 122 rotates with a low speed as shown in Figure 1B. This produces the speed difference between the two operating members 118 and 122 so that the steel ball 138 is brought into engagement with a slant surface 134a of the recess 134 of the operating member 118 as well as a slant surface 136a of the recess 136 of the operating member 122. As a result, the operating member 118 is caused to be moved in a direction shown by arrows 140, 142 in FIG. 1B or to be separated from each other. The movement of the operating member 118 causes the main clutch 116 to be engaged so that the inner and the outer rotating members are combined integrally.

Therefore, the sprocket 38 and the output shaft 16 is rotated as an integral unit so that the differential movement between the output shafts 14 and 16 for the front and rear wheels is prevented.

The switching mechanism 44, differential mechanism 46, the sprocket 38, clutch mechanism 30 and the electromagnet 128 are coaxially rearwardly arranged between the journal portion 18 and 36 on the output shaft 16 in this order.

Figure 2:
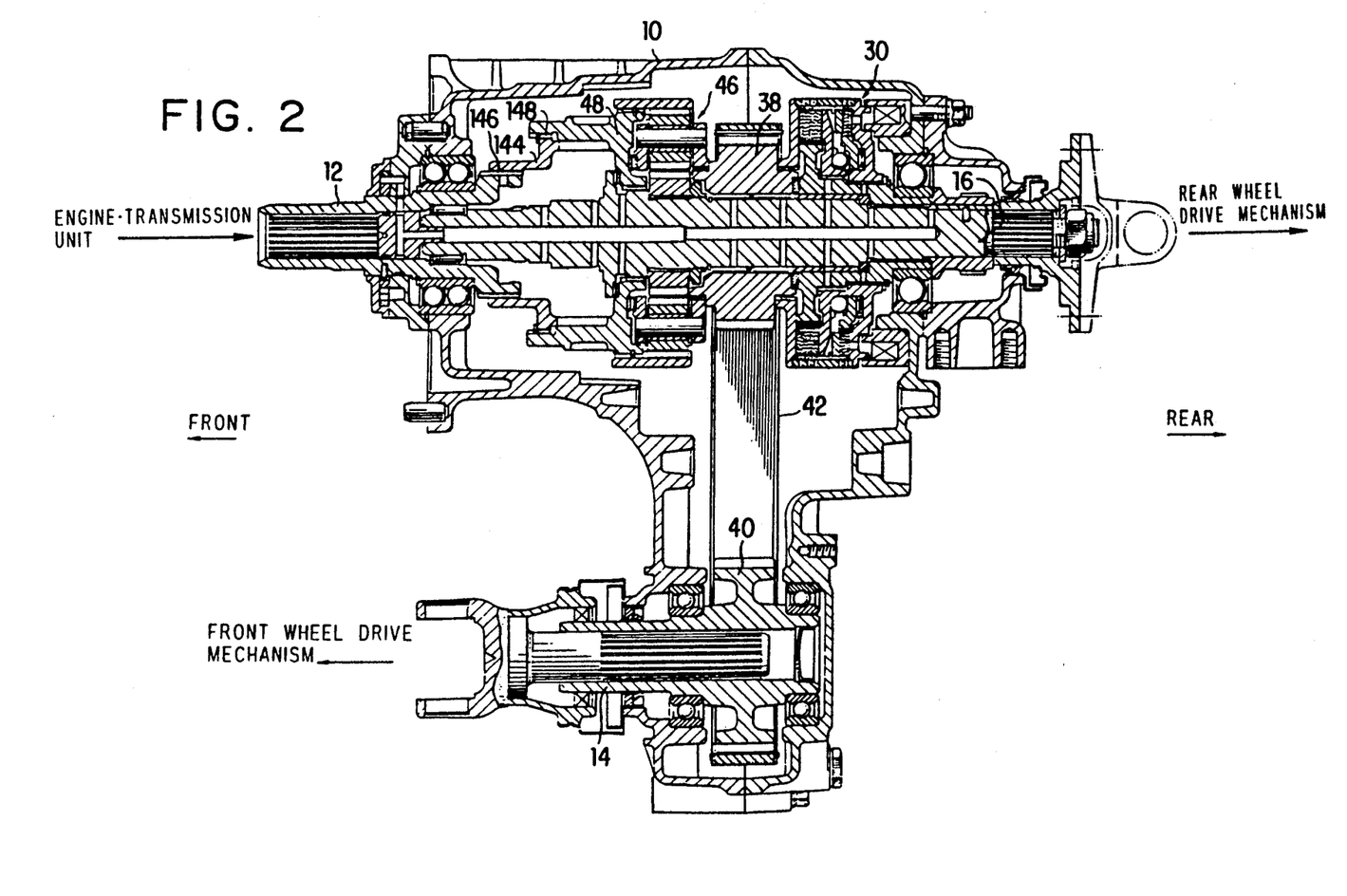
FIG. 2 is a sectional view of a power transmitting system in accordance with another embodiment of the present invention.

Referring to FIG. 2, there is shown a power transmitting system in accordance with another embodiment of the present invention.

The illustrated system is not provided with a speed switching mechanism, unlike the former embodiment shown in FIG. 1. Thus, the input shaft 14 is connected with the carrier 48 through a connecting member 144. The input shaft 12 is engaged with the connecting member 144 through a spline 146. The connecting member 144 is connected with the carrier 48 through a spline 148.

The operation of the driving power transmitting system shown in FIG. 2 is substantially the same as that of the former embodiment. Therefore, the detailed explanation thereof is omitted.

Figure 3:
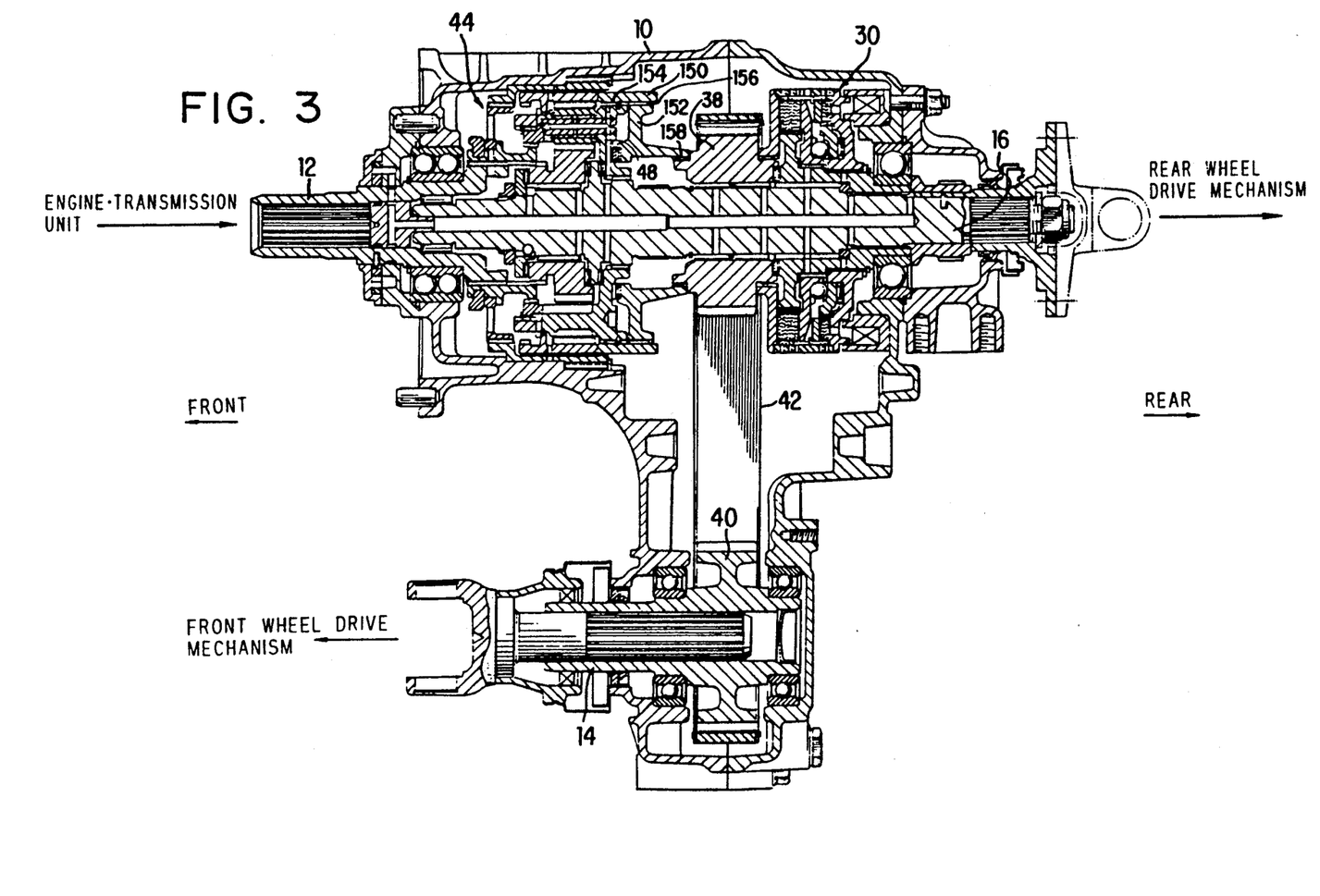
FIG. 3 is a sectional view of a power transmitting system in accordance with still another embodiment of the present invention.

According to FIG. 3, there is shown still another embodiment of the present invention.

The illustrated driving power transmitting system is provided with a speed switching mechanism as was the system shown in FIG. 1. However, the illustrated system of FIG. 3 has a part time 4WD in which the front wheels are normally driven and the rear wheels are driven on and off. Thus, the illustrated system is not provided with a differential mechanism unlike the systems shown in FIGS. 1 and 2. The carrier 48 is connected with the sprocket 38 through connecting members 150, 152. In this case, the carrier 48 is engaged with the connecting member 150 through a spline 154. The connecting member 152 is engaged with the sprocket 38 through a spline 158.

In the former embodiments, the clutch mechanism 30 functions as a switching between mechanism for switching allowance and prohibition of the differential movement. However, in the illustrated embodiment, the clutch 30 functions as a switching mechanism for switching between the two wheel drive condition (2WD) and the four wheel drive condition (4WD).

When the clutch mechanism 30 is not engaged, the output shaft 16 is allowed to rotate separately from the output shaft 14 so that the rotation of the input shaft 12 is transmitted to the output shaft 14 for the front wheels (2WD condition) through the switching mechanism.

When the clutch 30 is engaged, the output shaft 16 for the rear wheels is integrally engaged with the sprocket 38 and the output shaft 14 for the front wheels so that the rotation of the input shaft 12 is transmitted to the output shaft 14 for the front wheels through the sprocket 38 and thereafter to the output shaft 16 for the rear wheels through the sprocket 38 and the clutch mechanism 30 to establish the four wheel drive condition (4WD).

Figure 4:
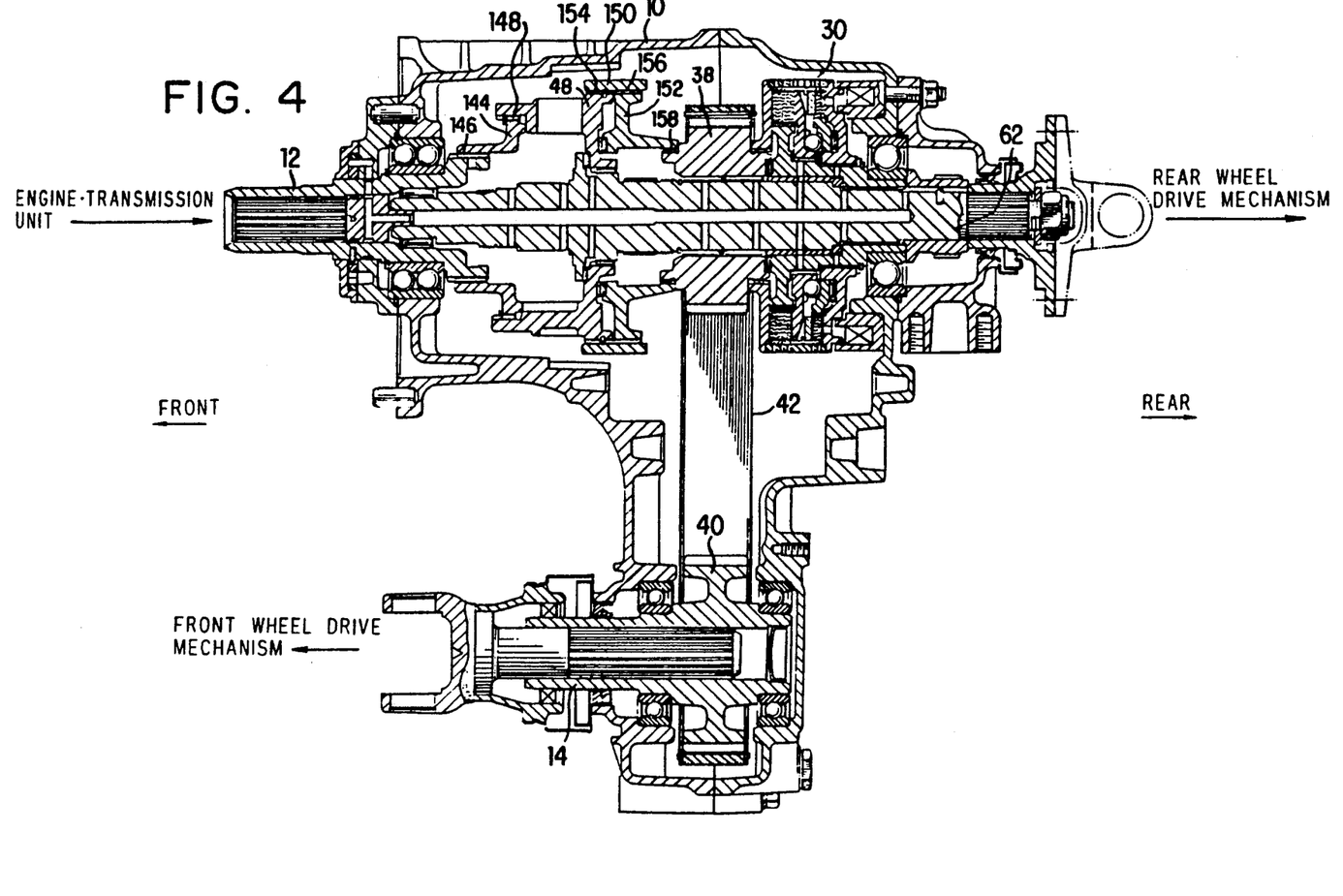
FIG. 4 is a sectional view of a power transmitting system in accordance with a further embodiment of the present invention.

Now referring to FIG. 4, there is shown further embodiment of the present invention.

The illustrated system has a part time 4WD having the same structure as the system shown in FIG. 3 except that a speed switching mechanism is not provided. Thus, the input shaft 12 is engaged with the sprocket 38 through the connecting members 144, carrier 48, and connecting members 150, 152.

It should be noted that although the present invention was described in connection with specific embodiments and by making reference to the accompanying drawings, many modifications can be made by the those skilled in the art based on the foregoing. It is intended to have all of these modifications fall within the scope of the present invention defined by the attached claims.

What is claimed is:

1. A power transmitting system for a vehicle comprising:
   a rotatable input shaft for introducing driving power into the system,
   a rotatable first output shaft for transmitting the driving power from the system,
   a rotatable second output shaft for transmitting the driving power from the system,
   a transmitting member rotatably mounted on the first output shaft for rotating the second output shaft,
   a clutch mechanism disposed adjacent to the transmitting member and mounted on the first output shaft for engaging the transmitting member with the first output shaft, said clutch mechanism having an outer rotating member engaged with the transmitting member,
   actuator means for actuating the clutch mechanism, and
   an inner rotating member disposed inside of the outer rotating member,
   wherein an inner surface of the outer rotating member is rotatably mounted on the inner rotating member at its rear end.

2. A power transmitting system as recited in claim 1, wherein the actuator means is disposed on a side of the clutch mechanism opposite from the transmitting member.

3. A power transmitting system as recited in claim 1, and further comprising a casing for receiving the input shaft and the first and second output shafts.

4. A power transmitting system as recited in claim 3, wherein the actuator means comprises an electromagnet mounted on the casing.

5. A power transmitting system as recited in claim 3, wherein the casing rotatably carries the first output shaft through a journal portion formed on the casing.

6. A power transmitting means as recited in claim 5, wherein the actuating means is located radially outside of the journal portion of the casing.

7. A power transmitting system as recited in claim 1, and further comprising switching means for switching between a high speed drive condition and a low speed drive condition for the vehicle, the switching means being disposed forward of the transmitting member on the first output shaft.

8. A power transmitting system as recited in claim 7, and further comprising a differential mechanism for providing differential movement between front and rear wheels, the differential mechanism being located forward of the transmitting member and rearward of the switching means.

9. A power transmitting system as recited in claim 8, wherein the switching means, the differential mechanism, the transmitting member, the clutch mechanism and the actuator means are coaxially rearwardly arranged on the first output shaft in this order.

10. A power transmitting system as recited in claim 7, wherein a main clutch is disposed between a front end of an outer portion of the inner rotating member and the outer rotating member with regard to a radial direction of the first output shaft.

11. A power transmitting system as recited in claim 10, and further comprising a first operating member disposed rearward of the main clutch and engaged with the inner rotating member for an axial movement of the first output shaft.

12. A power transmitting system as recited in claim 10, wherein the inner rotating member is rotated together with the outer rotating member when the main clutch is engaged.

13. A power transmitting system as recited in claim 11, and further comprising a second operating member located rearward of the first operating member and axially movably disposed forward of a radially extended rear end portion of the outer rotating member.

14. A power transmitting system as recited in claim 13, and further comprising a pilot clutch disposed rearward of the main clutch.

15. A power transmitting system as recited in claim 14, and further comprising an iron piece axially movably carried by the outer rotating member forward of the pilot clutch, which is located forward of the actuator means.

16. A power transmitting system as recited in claim 15, wherein the iron piece is urged toward the actuator means when the actuator means is actuated so that the pilot clutch is engaged.

17. A power transmitting system as recited in claim 16, wherein the outer rotating member is joined with the second operating member as a single unit when the pilot clutch is engaged.

18. A power transmitting system as recited in claim 17, wherein engagement of the pilot clutch causes the main clutch to be engaged so that the inner and outer rotating members are combined integrally.

19. A power transmitting system as recited in claim 1, wherein the clutch mechanism controls transmission of a driving power between front and rear wheels. movement between front and rear wheels, the differential mechanism being located forward of the transmitting member.

20. A power transmitting system as recited in claim 1 further comprising a differential mechanism for providing differential movement between front and rear wheels, the differential mechanism being located forward of the transmitting member.

* * * * *